Nov. 21, 1967   R. J. RICCIARDI   3,353,720
MATERIAL HANDLING EQUIPMENT
Filed Oct. 24, 1965
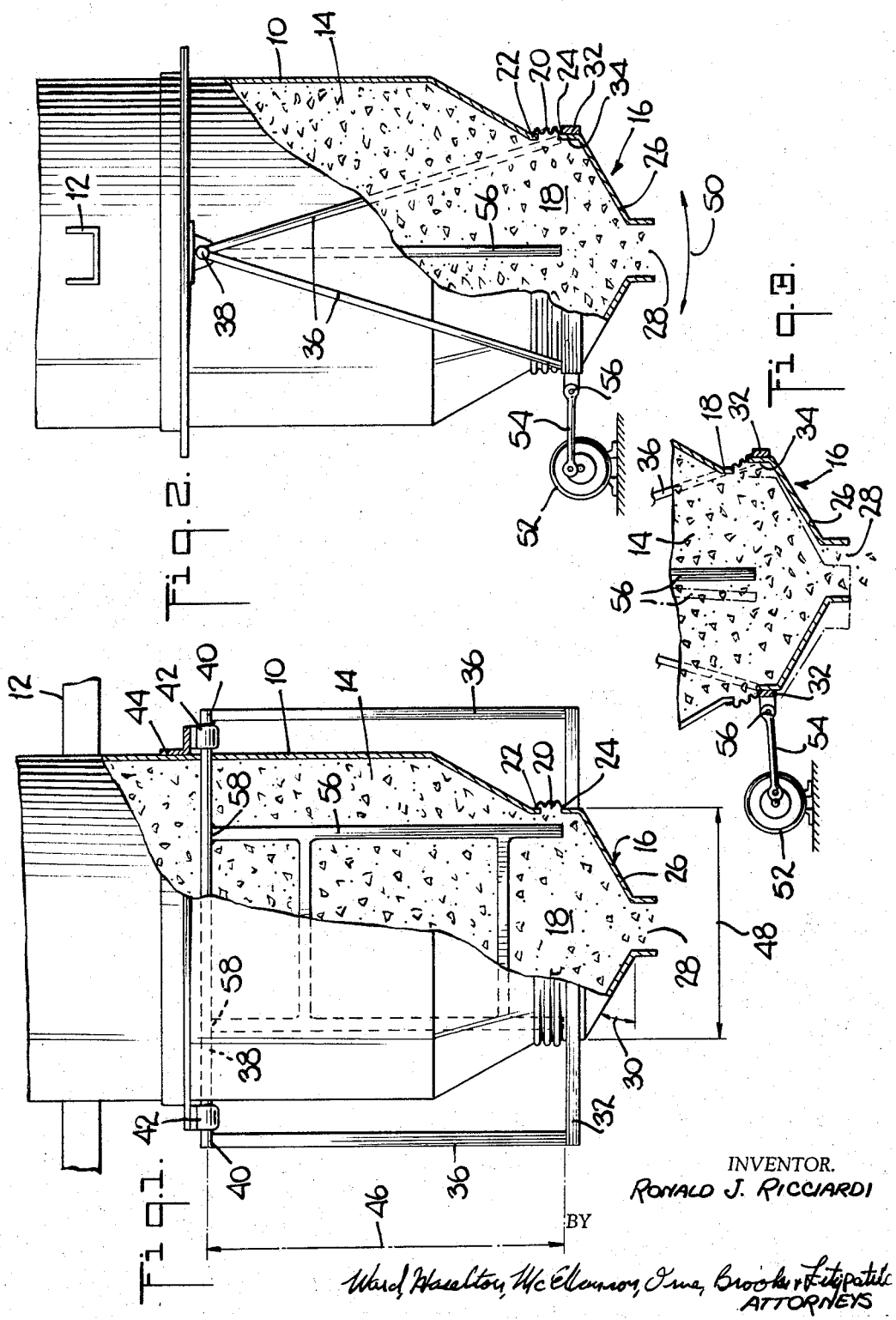
INVENTOR.
RONALD J. RICCIARDI
BY
Ward, Haselton, McElhannon, Orns, Brooks & Fitzpatrick
ATTORNEYS

United States Patent Office 3,353,720
Patented Nov. 21, 1967

3,353,720
MATERIAL HANDLING EQUIPMENT
Ronald J. Ricciardi, Garfield, N.J. (121 Dayton Ave., Passaic, N.J. 07055)
Filed Oct. 24, 1965, Ser. No. 504,429
3 Claims. (Cl. 222—200)

This invention pertains to material handling equipment and more particularly to means for delivering dry comminuted or aggregate material from a supply bin or hopper.

A device constructed in accordance with the concept of this invention is useful for the promotion of flow of dry particulate materials from stationary storage bins, hoppers, silos or the like. This device is particularly useful when the storage container is of relatively large size. Heretofore, various devices and methods have been employed to promote the flow of material from containers, such devices include vibrators attached to the walls of the bin, air jets or pads to inject air into the material within the bin, and gyration or vibration of the entire bin, for example. However, these devices have not been entirely satisfactory for one reason or another. Movement of a very large bin or silo is impractical and injection apparatus is prone to be cumbersome and complicated. Vibration techniques are effective in some cases, but they are limited by their inability to promote flow of all materials and from certain areas of the bin. Further, apparatus employing vibration tend to be limited by a shortened life expectancy.

In order to overcome the aforementioned limitations and problems, the present invention provides new and improved apparatus for dispensing material from a container which briefly stated comprises an upper storage bin and a hopper bottom disposed below said storage bin in material receiving attitude, the hopper bottom having a lower dispensing outlet from which the material is delivered. Means are provided for supporting the hopper bottom for pivotal movement about a horizontal line which is located a predetermined distance thereabove and means are provided which are connected to the hopper bottom for imparting arcuate reciprocating motion thereto.

In one form of the invention, the hopper bottom is pivoted about a pivot shaft which is disposed a predetermined distance above the hopper bottom. Said pivot shaft extends either externally or internally of the upper storage bin and an integral agitator assembly may be fixedly secured thereto for gentle oscillation thereabout simultaneously with movement of the hopper bottom. In this manner the material is gently agitated and caused to flow towards the dispensing outlet of the hopper bottom.

A feature of my invention resides in the provision of new and improved apparatus for conditioning and dispensing particulate solid material which is relatively simple and inexpensive to manufacture and which is highly efficient in operation.

Another feature of the invention is the provision of a new and improved apparatus which promotes flow of many different kinds and sizes of material from a storage container, which promotes flow of material from all areas of the container, and which readily promotes flow of material from large or small storage containers.

A further feature of the invention resides in the provision of means for promoting flow of material from a storage container which gently rocks the material where the material converges towards the dispensing outlet, but does not cause churning, upheaving or excessive agitation.

Still another feature of my invention is the provision of means for gently rocking the material adjacent the dispensing outlet while simultaneously gently agitating the material internally of the storage bin.

Yet another feature of my invention resides in the provision of a new and improved apparatus for dispensing particulate material which is rugged in construction and which is durable in use.

Other objects, advantages and features reside in the details of construction and operation, as more fully hereinafter described and claimed, reference being had to the accompanying drawings forming part hereof, wherein like numerals refer to like parts throughout, and in which:

FIG. 1 is a side elevation, partially broken away, showing a stationary bin and hopper bottom constructed in accordance with my invention;

FIG. 2 is a front elevation, partially broken away, showing the internal construction of my apparatus; and FIG. 3 is a fragmentary view showing details of the hopper bottom rocking means.

In the illustrated embodiment of my invention, the apparatus for feeding and conditioning particulate solid material includes a stationary storage bin 10 mounted by means of stationary bin supports 12 and arranged for containing a supply of particulate material 14. A hopper bottom 16 is disposed under the outlet 18 of the stationary bin 10 in material receiving attitude as shown in the drawings. A flexible sleeve 20 interconnects the stationary bin 10 and the hopper bottom 16 as at 22 and 24, respectively. The flexible sleeve 20 serves to prevent the loss of material during its passage from the stationary bin 12 to the hopper bottom 16 as well as preventing the escape of dust into the surrounding atmosphere, but nevertheless allowing for movement of the members one with respect to the other.

The hopper bottom 16 may be either of conical or pyramidal configuration, and the sidewalls 26 thereof are downwardly, inwardly extending, terminating in a lower dispensing outlet 28. The slope 30 (FIG. 1) of the sidewalls with respect to the horizontal is from about 5 degrees to about 45 degrees depending upon the particular material being handled.

For purposes of supporting the hopper bottom 16, a hopper bottom frame 32 is provided which is fixedly connected thereto as at 34 (FIGS. 2 and 3) by means of welding or the like. The frame 32 has two pair of oppositely disposed upright members 36 which are fixedly connected to a horizontally disposed pivot shaft 38 as at 40 (FIG. 1), pivot shaft 38 being mounted for pivotal movement in support bearings 42 (FIG. 1), provided for the purpose, thereby forming a swing or cradle-like structure for rocking the hopper bottom 16. The bearings 42 are mounted on the sidewalls of the stationary bin 10 as by means of bearing ring 44 as seen in FIG. 1. The hopper bottom 16 is adapted for pivotal movement about pivot shaft 38 which is located at a distance 46 (FIG. 1) above the top of the hopper bottom 16 from about 0.1 to about 3 times the maximum circumferential distance of the hopper bottom. When the hopper bottom is of conical configuration, the distance 46 (FIG. 1) between the pivot shaft 38 and the top of the hopper bottom is about .3 to about 9 times the diameter 48 (FIG. 1) of the hopper bottom.

As best seen in FIGS. 2 and 3, in order to impart arcuate reciprocating motion to the hopper bottom 16, as shown by arrow 50, an electric motor 52 reciprocally drives connecting rod 54 which is pivotally connected to the frame 32 as at 56. According to the concept of this invention, the hopper bottom 16 is gently, reciprocally, pivotally rocked back and forth causing the material to flow downwardly from the stationary bin, through the hopper bottom and out the discharge outlet 28. Motion of the hopper bottom promotes flow of the material where the material converges towards the dispensing outlet without packing or plugging. Thus, motion is imparted to the material at precisely the critical point where it is most required. The aforementioned motion of the hopper bottom and the geometrical proportions pointed out above cause a gradually increasing movement of the material as it progresses downwardly thereby insuring a nonsegregated, non-degraded, non-aerated and non-compacted continuous supply of material through the dispensing outlet.

Additional gentle agitation in the stationary bin 10 may be effected by means of internal agitators 56 which are fixedly connected to the pivot shaft 38 as at 58 (FIG. 1). As the pivot shaft 38 oscillates due to movement of the hopper bottom frame 36, it causes the agitators to move in a like manner. This additional agitation is particularly desirable when handling certain difficult materials.

In view of the foregoing description, taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claims.

Having thus described the invention, what I claim is:

1. Apparatus for conditioning and dispensing particulate solid material comprisng an upper storage bin, a hopper bottom having sidewalls having a slope of between about 5 degrees and about 45 degrees with respect to the horizontal, a flexible sleeve interconnecting said bin and said hopper bottom, a frame connected to said hopper bottom, said frame having upwardly extending members, a pivot shaft extending transversely through said upper storage bin and being pivotally mounted thereon, said upwardly extending members being connected to said pivot shaft outwardly of said storage bin, said pivot shaft being located a distance from said hopper bottom of the order of about .1 to about 3 times the maximum circumference of said hopper bottom, and an agitator fixedly connected to said pivot shaft to extend downwardly within said upper storage bin, means connected to said hopper bottom for imparting arcuate reciprocating motion simultaneously to said hopper bottom and said agitator.

2. Apparatus for conditioning and dispensing particulate solid material according to claim 1, wherein said agitator has a ladder-like configuration and wherein said agitator oscillates in synchronization with said hopper bottom.

3. Apparatus for conditioning and dispensing particulate solid material comprising an upper storage bin, a hopper bottom, means interconnecting said bin and said hopper bottom, a frame connected to said hopper bottom, said frame having upwardly extending members, a pivot shaft extending transversely through said upper storage bin and being pivotally mounted thereon, said upwardly extending members being connected to said pivot shaft, an agitator fixedly connected to said pivot shaft to extend downwardly within said upper storage bin, and means connected to said hopper bottom for imparting arcuate reciprocating motion simultaneously to said hopper bottom and said agitator.

References Cited

UNITED STATES PATENTS

| | | | |
|---|---|---|---|
| 2,161,342 | 6/1939 | Francis | 222—199 |
| 2,729,362 | 1/1956 | Hughes | 222—200 X |
| 3,187,884 | 6/1965 | Carrier | 222—199 X |

ROBERT B. REEVES, *Primary Examiner.*

STANLEY H. TOLLBERG, *Examiner.*